US007176442B2

(12) United States Patent
Feldmeier et al.

(10) Patent No.: US 7,176,442 B2
(45) Date of Patent: Feb. 13, 2007

(54) OPTICAL NAVIGATION DEVICE WITH OPTICAL NAVIGATION QUALITY DETECTOR

(75) Inventors: David Charles Feldmeier, Sunnyvale, CA (US); Ramakrishna Kakarala, Santa Clara, CA (US); John Stewart Wenstrand, Menlo Park, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 238 days.

(21) Appl. No.: 10/918,500

(22) Filed: Aug. 13, 2004

(65) Prior Publication Data

US 2006/0033014 A1   Feb. 16, 2006

(51) Int. Cl.
  *G06M 7/00* (2006.01)
  *G09G 5/08* (2006.01)
(52) U.S. Cl. ...................................... 250/221; 345/163

(58) Field of Classification Search ............... 250/221, 250/222.1; 345/156–158, 163, 166, 167; 382/313
See application file for complete search history.

(56) References Cited

U.S. PATENT DOCUMENTS

| 6,005,681 | A  | * | 12/1999 | Pollard ........................ 358/473 |
| 6,974,947 | B2 | * | 12/2005 | Black et al. ................. 250/221 |
| 7,039,218 | B2 | * | 5/2006  | Lin ............................. 382/107 |
| 2004/0086154 | A1 | * | 5/2004  | Lin ............................. 382/107 |
| 2005/0139944 | A1 | * | 6/2005  | Lin et al. ..................... 257/432 |

* cited by examiner

*Primary Examiner*—Stephone B. Allen

(57) ABSTRACT

An optical navigation system, e.g. optical mouse, determines optical navigation quality by examining some or all of the photosensors of a frame or monitoring intermediate or final results of the motion estimation system. The optical navigation quality is then used to determine the navigation output produced by the optical navigation system.

15 Claims, 4 Drawing Sheets

OPTICAL NAVIGATION DEVICE WITH OPTICAL NAVIGATION QUALITY DETECTOR

BACKGROUND

Optical navigation sensors typically are used for computer input devices, e.g. optical mice. Optical navigation sensors detect motion by comparing successive patterns of light, e.g. "frames", received by an array of photosensors. The optical navigation sensor then estimates which possible motion of the mouse is most likely to have occurred based on the relationship between the current frame and a previous frame.

However, the likelihood that the motion estimate from the optical navigation sensor is correct depends on the quality of the frames that are compared. High-quality frames exhibit distinct features that can be tracked from frame to frame. Low-quality frames have few distinct features.

Whenever the frame quality is low, the motion estimation by the optical navigation sensor may not reflect the motion of the optical sensor. Low quality frames can occur for several reasons. If the photosensors are exposed to too much light, then all of the photosensors may saturate at the maximum value. If the photosensors are exposed to insufficient light, then all of the photosensors may remain at the minimum value. If the surface over which the mouse operates lacks distinct features, then navigation is difficult. If the optical sensor is too far from the surface, then any distinctive features may be out of focus. If the optical sensor moves too quickly, there may be insufficient position overlap between frames for accurate motion tracking.

SUMMARY

In the present invention, an optical navigation system, e.g. optical mouse, determines optical navigation quality by examining some or all of the photosensor values of a frame or monitoring intermediate or final results of the motion estimation system. The optical navigation quality is used to select the navigation output produced by the optical navigation system from two or more alternatives.

The navigation system includes a photosensor array receives reflected light from a surface and generates an analog signal indicative of the reflected light. An analog to digital converter receives the analog signal and generates a current frame signal indicative of the reflected light. The frame memory stores a previous frame signal. A motion estimation circuit that receives the two signals, indicative of current frame and previous frame, and generates an output signal indicative of the optical sensor motion. A synthetic motion signal is selected if the optical navigation quality is poor.

DETAILED DESCRIPTION

The present invention discloses a navigation device, e.g. optical mouse that eliminates spurious outputs when optical navigation is unable to determine the motion of the navigation device with sufficient accuracy. Whenever the optical navigation is inaccurate, then a synthetic navigation signal is used instead of the inaccurate optical navigation signal.

Two issues are addressed: detection of a situation in which optical navigation may not provide a correct motion estimation and the generation of a suitable synthetic output that replaces the output derived based on optical navigation. There are three basic elements. The first element is an Optical Navigator that estimates mouse motion based on a comparison of the current frame with a previous frame. The second element is a Synthetic Navigation Generator that produces an alternative navigation signal when the output of the Optical Navigator is deemed to be inaccurate. The third element is an Optical Quality Estimator that estimates the quality of the Optical Navigator output and determines whether the output of the Optical Navigator or the Synthetic Navigator should be used as the navigation device output.

Figure 1:
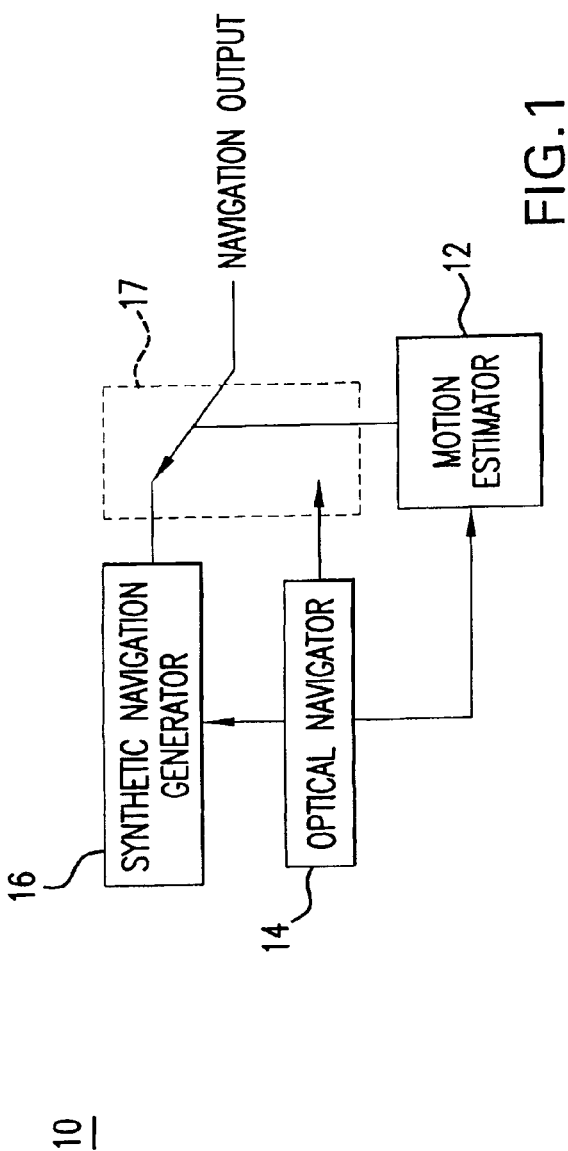
FIG. 1 shows a navigation system according to the present invention.

FIG. 1 illustrates an optical navigation system 10 of the present invention. An Optical Quality Estimator 12 estimates the likelihood that the output of the Optical Navigator 14 is accurate. If so, then the optical navigator output is selected using control switch 17. Otherwise, the control switch 17 selects the output of the Synthetic Navigation Generator.

In operation, the Optical Quality Estimator 12 can assess the expected quality of the Optical Navigator 14 output in several ways. An explanation of possible quality estimation techniques requires a more detailed understanding of the Optical Navigator 14.

Figure 2:
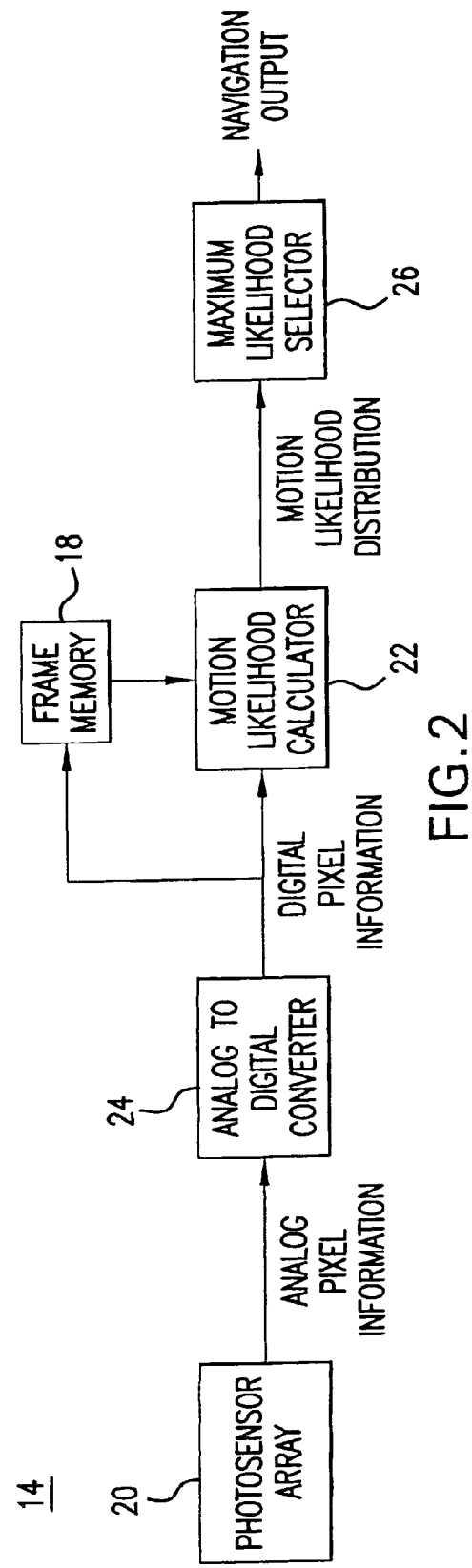
FIG. 2 is a block diagram of the optical navigator shown in FIG. 1.

FIG. 2 illustrates the Optical Navigator 14 shown in FIG. 1. The Frame Memory 18 stores some or all of the digital values derived from a single frame observed by the Photosensor Array 20. The Motion Likelihood Calculator 22 compares the current frame, obtained from the analog-to-digital converter (ADC) 24, with a previous frame, that is stored in the Frame Memory 18 and assigns a likelihood value to each of various possible mouse movements. In an illustrative example, the maximum mouse movement between two frames is assumed to the diameter of one photosensor. The motion likelihood distribution, calculated by the Motion Likelihood Calculator 22, includes values that correspond to "no movement" as well as for eight movements corresponding to movement of a single photosensor diameter in each of the eight compass directions: N, NE, E, SE, S, SW, W and NW. The values reflect the likelihood that a particular movement occurred. Typical methods of assessing likelihood are by comparing the two frames for all potential movements, using such methods as correlation or sum of squared differences.

From the motion likelihood distribution, the Maximum Likelihood Selector 26 determines which potential motion has the highest likelihood of occurring. This may be done by waiting until all potential movements have been assessed before finding the motion with highest likelihood, or maximum likelihood calculation could maintain the current maximum value and movement associated with the maximum value and compare each new value as it is generated.

While the Optical Navigator 14 in this example considers only nine possible motions, more sophisticated optical navigators can estimate motion reliably even if the optical navigation sensor moves several photosensor diameters from sample to sample.

Figure 3A:
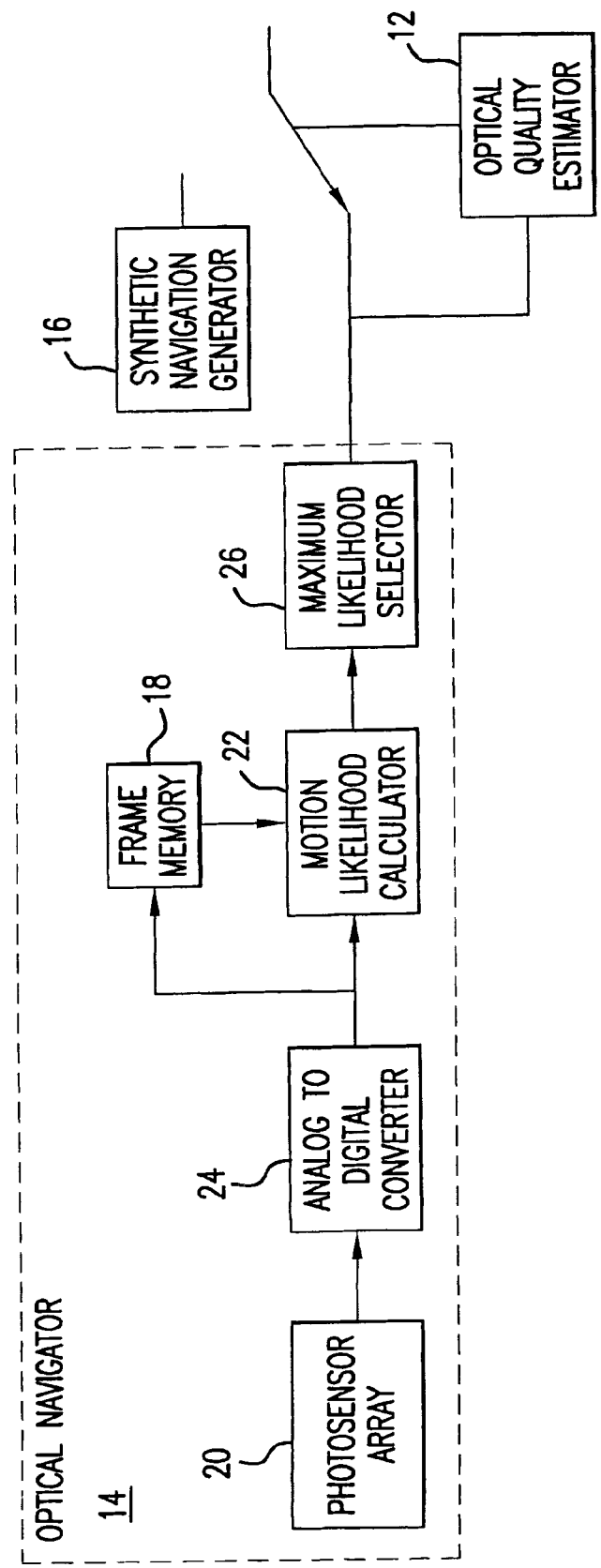
FIGS. 3A–C illustrate optical navigator outputs from which the Optical Quality Estimator may receive data.
Figure 3B:
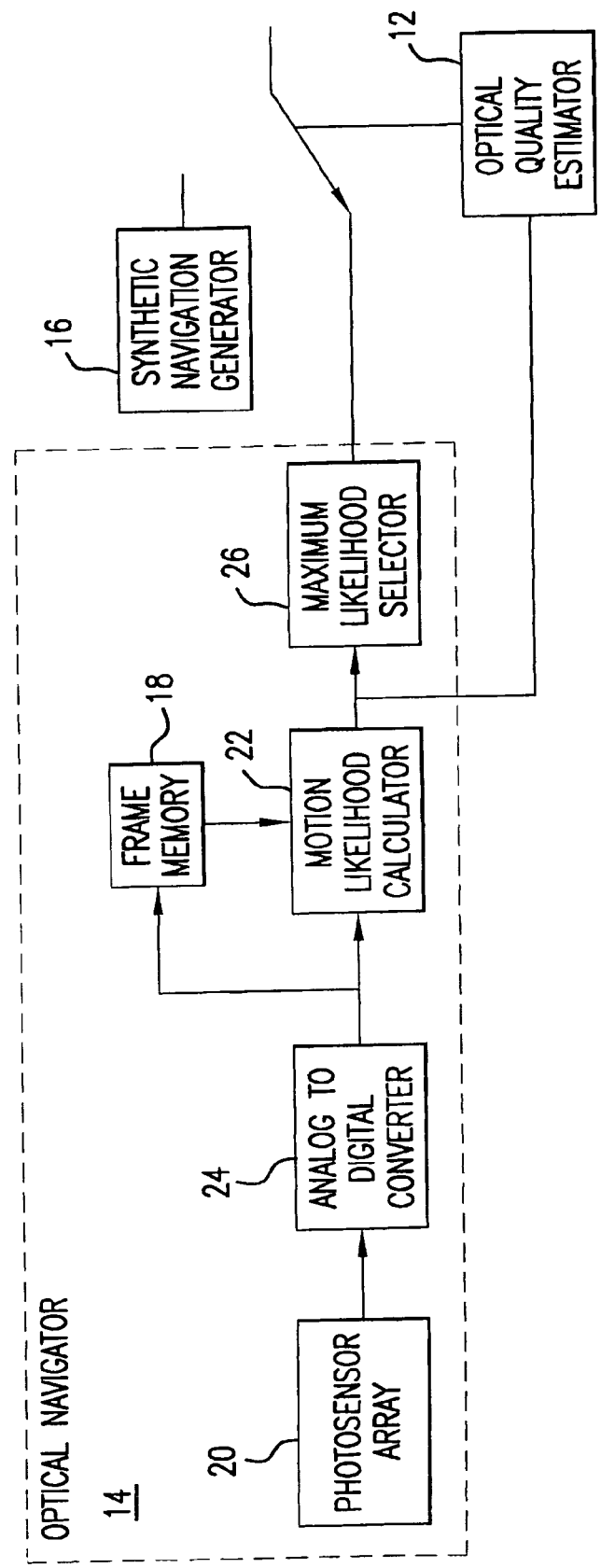
Figure 3C:
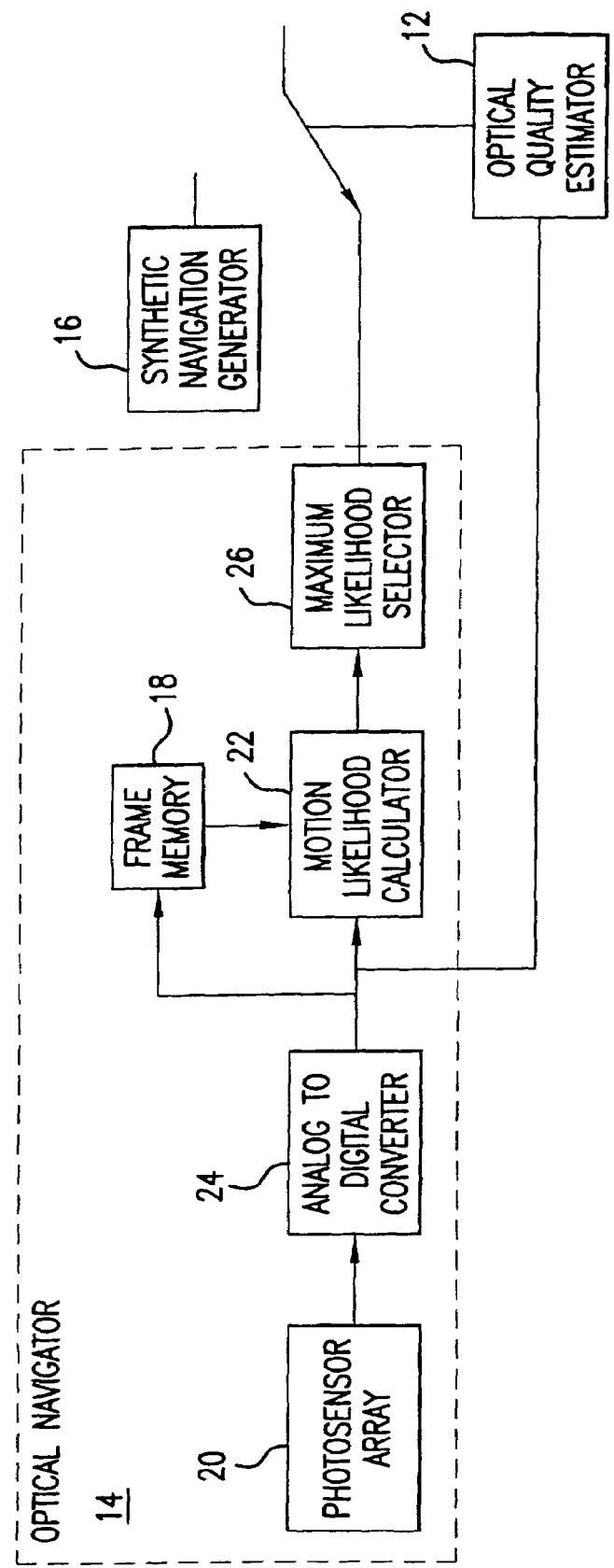

FIGS. 3A–C illustrate Optical Navigator 14 outputs from which the Optical Quality Estimator may receive data. In FIG. 3A, the data comes from the Maximum Likelihood Selector 26. In FIG. 3B, the data comes from the Motion Likelihood Calculator 22. In FIG. 3C, the data comes from the Analog to Digital Converter 24.

In FIG. 3A, when the output of the Maximum Likelihood Selector 26 is incompatible with the movements that could be expected from an actual mouse, then it is likely that optical navigation quality is low. Mouse motion estimated by the Optical Navigator 14 is evaluated to determine whether the estimated motion is unlikely to occur during normal mouse operation, e.g. excessive velocity or acceleration. U.S. Pat. No. 6,433,780, "Seeing eye mouse for a computer system", issued 13 Aug. 2002, assigned to Agilent Technologies, Gordon, et al. disclose one technique for determining when the velocity exceeds the expected mouse velocity. Gordon, et al. disclose selecting a synthetic navigation signal corresponding to "no movement" when estimated sensor velocity exceeds a threshold.

In FIG. 3B, the output of the Motion Likelihood Calculator 22 is evaluated. One method disclosed by Gordon et al, in U.S. Pat. No. 6,433,780, looks for a predetermined "curvature". Gordon teaches looking to see whether the likelihoods of multiple movements are too similar, i.e. there is a lack of a distinct maximum. Thus, if multiple motions are equally likely, the optical quality is likely to be low. In one illustrative example, the optical navigation quality is determined by checking if the maximum likelihood value differs from the other likelihood values by an amount that is statistically significant.

In FIG. 3C, the digitized set of values from the Photosensor Array 20 is used by the Optical Quality Estimator 12. When the frame lacks distinct features, it is difficult to navigate. The features may be counted to see if the number exceeds some threshold. Alternatively, a histogram of photosensor values of a frame shows a number of high and low values (i.e., they won't be uniform) when distinct features exist as will be described.

When few distinct features exist, the spread or "variance" of photosensor values of a frame drops due to lack of contrasting features. Therefore, by measuring the concentration of the histogram, optical navigation quality can be detected with a simple measurement that can be performed while monitoring the pixel values to ensure proper exposure. When optical navigation quality uses pixel values, the quality estimation depends on the data from a single frame and not on the relationship between two frames.

The histogram is more spread out when a frame has distinct features. This is expected since the automatic exposure system that controls the photosensor exposure time tries to adjust exposure time to maximize contrast. The histogram is more concentrated when the mouse is lifted for two reasons. One, the image becomes out of focus when lifted. Two, the center of the image spot moves off of the sensor imaging area, as the mouse is elevated.

In operation, the Optical Quality Estimator 12 receives a frame and generates a histogram. The histogram using N bins is computed by counting the number of pixels in each frame whose value lie in the bins. For example, when the pixels are digitized with q bits per pixel, then any pixel value lies between 0 and $2^q-1$. This range is divided in N bins of equal width, e.g. $2^q/N$. When q=8, the pixel values are between 0 and 255. If N=8, then each bin has a width of 256/8=32. Pseudocode 1 illustrates one way to compute the histogram.

```
for all pixels
    bin – pixel value / 32 ; /* compute bin number */
    histogram[bin] =histogram[bin] + 1 ;
end
```

Table 1 shows the histogram (count in each bin) for a typical frame when the mouse is on a surface and when lifted. The frame is assumed to have 8 bits per photosensor value.

TABLE 1

| Bin Range | 0–31 | 32–63 | 64–95 | 96–127 | 128–159 | 160–191 | 192–223 | 224–255 |
|---|---|---|---|---|---|---|---|---|
| On surface | 16 | 71 | 103 | 137 | 121 | 31 | 5 | 0 |
| Lifted | 7 | 106 | 302 | 62 | 7 | 0 | 0 | 0 |

Simple measures of concentration may be used to determine the optical navigation quality. One is the spread between the maximum and minimum occupied bins. A bin is considered occupied when the number of pixels whose values lie in it cannot be attributed to noise. Pseudocode 2 determines the minimum and maximum indices of occupied bins. In this embodiment, 8 bins are used, indexed 0 to 7. The counts in the histogram are assumed to be in the array called hist[ ]

```
minbin = 7; /* initial values */
maxbin = 0;
for (i = 7; i >= 0; i--)
    if (hist[i] > histogram_noise_level)
        minbin = i;
            /* find smallest index of occupied histogram bin */
for (i = 7; i <= 0; i++)
    if (hist[i] > histogram_noise_level)
        maxbin = i;
            /* find largest index of occupied histogram bin */
/* If the spread is too small, optical navigation is poor */
spread = maxbin – minbin
if (spread < MIN_SPREAD)
    declare_poor_optical_navigation_quality( );
```

Other measures of spread that could be used include variance, third, fourth, or higher moments.

Another way to evaluate optical navigation quality does not depend upon information from the optical navigator. For example, a switch may be included on the mouse housing such that the switch is depressed when the user lifts the mouse from the surface upon which the mouse usually operates. In this case, the Optical Quality Estimator 12 switches to the synthetic motion signal because the surface will be too distant for accurate optical navigation. Once the Optical Quality Estimator 12 determines that the optical navigation signal may not provide accurate information, it can switch to an alternate navigation signal. The Synthetic Navigation Generator 16 provides a synthetic motion signal that may be used instead. The desired behavior of the Synthetic Navigation Generator 16 depends on why the optical navigation quality is inadequate. When the mouse has been raised above the surface upon which navigation occurs, then the most appropriate navigation output may be to indicate that no motion is occurring. When the mouse moves over a spot on the surface for which optical navigation is difficult, then the most appropriate navigation output may be to continue the most recently observed optical navigation signals, with perhaps a running average of a plurality of the most recently observed optical navigation signals to provide more consistent mouse behavior.

In an alternate embodiment, the Optical Quality Estimator 12 may select from among multiple synthetic navigation signals. For example, perhaps different reasons for poor optical navigation can be distinguished by observing the digitized photosensor values at the output of the ADC 24.

Another possibility is to construct a synthetic output that works adequately in multiple cases. For example, the initial output of the Synthetic Navigation Generator 16 may be to continue the most recently observed motion while the optical navigation data was good, and then to decrease the magnitude of the movement over time until the output signal indicates no movement.

The invention may be implemented in multiple ways. For example, the Optical Quality Estimator 12, Synthetic Navigation Generator 16, and the control switch all may be implemented as an integrated circuit. Alternatively, the various elements of the invention may be distributed in two or more places. For example, the Optical Navigator 14 and Optical Quality Estimator 12 may be located on an integrated circuit, and the Synthetic Navigation Generator 16 and control switch may be located in a separate microcontroller.

It is even possible that an element of the invention can be split into pieces, and the pieces implemented in different places. For example, consider an Optical Quality Estimator 12 that estimates quality based on the number of navigation features in a frame, where a feature is indicated by a pair of adjacent pixels that differ by a preselected amount. If the number of features is greater than a preselected value, then the optical navigation quality is considered acceptable. It is possible to implement the Optical Quality Estimator 12 in two pieces: the first piece is the navigation feature counter and the second piece is a comparator that determines whether the preselected threshold has been exceeded. The first piece can be included on the same integrated circuit as the Optical Navigator 14 and the second piece can be implemented on a separate microcontroller.

A consequence of splitting the Optical Quality Estimator 12 as described above is that the feature count information must be made available to the microcontroller (not shown). One way to do this is to make the current feature count available in a register of the chip that contains the Optical Navigator 14. The microcontroller reads the value in the register, compares the read value to a preselected threshold, and selects the optical navigation signal or the synthetic navigation signal accordingly.

We claim:

1. A navigation system comprising:
   an optical navigator configured to generate a navigation output for motion estimation; and
   an Optical Quality Estimator connected to the optical navigator to receive the navigation output, the Optical Quality Estimator being configured to process the navigation output to estimate the quality of the motion estimation of the optical navigator with respect to accuracy and to generate a quality signal.

2. A navigation system, as defined in claim 1, further comprising:
   a housing that includes the optical navigator and the Optical Quality Estimator; and
   a switch, attached to the housing and operably connected to the Optical Quality Estimator, provides an input signal to the Optical Quality Estimator when the switch is depressed.

3. A navigation system, as defined in claim 1, the optical navigator including:
   a photosensor array configured to receive reflected light from a surface and to generate a current frame signal indicative of the reflected light;
   an analog to digital converter connected to the photosensor array to receive the current frame signal and configured to generate a digital signal;
   a frame memory connected to the analog to digital converter to receive the digital signal and configured to provide a previous frame signal;
   a motion likelihood calculator connected to the frame memory to receive the digital signal and the previous frame signal and configured to generate a motion likelihood output indicative of a motion likelihood distribution; and
   a maximum likelihood selector connected to the motion likelihood calculator to receive the likelihood output and configured to generate a motion output signal.

4. A navigation system, as defined in claim 3, further including a source configured to emit a radiation towards the surface, wherein the source is selected from a group comprising visible light, infrared light, and ultraviolet light.

5. A navigation system, as defined in claim 4, wherein the source is selected from a group comprising coherent, partially coherent, and incoherent electromagnetic sources.

6. A navigation system, as defined in claim 3, the Optical Quality Estimator being connected to the analog to digital converter of the optical navigator to receive the digital signal as the navigation output, the digital signal including a plurality of photosensor values, the Optical Quality Estimator being configured to process the photosensor values to see if the number of distinct features in the digital signal exceeds a threshold to estimate the quality of the motion estimation of the optical navigator with respect to accuracy.

7. A navigation system, as defined in claim 3, the Optical Quality Estimator being connected to the analog to digital converter of the optical navigator to receive the digital signal as the navigation output, the digital signal including a plurality of photosensor values, the Optical Quality Estimator being configured to process the photosensor values to compute a histogram of the photosensor values and measure the concentration of the histogram to estimate the quality of the motion estimation of the optical navigator with respect to accuracy.

8. A navigation system, as defined in claim 3, the Optical Quality Estimator being connected to the motion likelihood calculator of the optical navigator to receive the motion likelihood output as the navigation output, the motion likelihood output including likelihood values corresponding to different possible movements, the Optical Quality Estimator being configured to process the likelihood values to estimate the Quality of the motion estimation of the optical navigator with respect to accuracy.

9. A navigation system, as defined in claim 8, the Optical Quality Estimator being configured to check if the maximum value of the likelihood values differs from other values of the likelihood values by an amount that is statistically significant.

10. A navigation system, as defined in claim 3, wherein the Optical Quality Estimator compares the magnitude of the velocity of the motion output signal with a preset threshold.

11. A navigation system, as defined in claim 3, wherein Optical Quality Estimator compares the magnitude of the acceleration of the motion output signal with a preset threshold.

12. A navigation system, as defined in claim 3, comprising:
- a synthetic navigation generator connected to the optical navigator to receive a previous motion output signal that is indicative of a previous motion estimation, the synthetic navigation generator being configured to generate a synthetic motion signal in response to the previous motion output signal; and
- the Optical Quality Estimator being configured to select one of the motion output signal and the synthetic motion signal.

13. A navigation system, as defined in claim 12, wherein the synthetic motion signal represents no movement.

14. A navigation system, as defined in claim 12, wherein the synthetic motion signal represents continuation of previously observed movement as indicated by the previous motion output signal of the optical navigator.

15. A navigation system as defined in claim 12, wherein the synthetic motion signal represents continuation of previously observed movement as indicated by the previous motion output signal of the optical navigator with decreasing magnitude with increasing time.

* * * * *